United States Patent
Hu et al.

(10) Patent No.: US 11,238,010 B2
(45) Date of Patent: Feb. 1, 2022

(54) SAND TIMER ALGORITHM FOR TRACKING IN-FLIGHT DATA STORAGE REQUESTS FOR DATA REPLICATION

(71) Applicant: EMC IP Holding Company LLC, Hopkinton, MA (US)

(72) Inventors: Ying Hu, Northborough, MA (US); Xiangping Chen, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 14 days.

(21) Appl. No.: 16/832,202

(22) Filed: Mar. 27, 2020

(65) Prior Publication Data

US 2020/0226097 A1     Jul. 16, 2020

Related U.S. Application Data

(63) Continuation of application No. 16/162,786, filed on Oct. 17, 2018, now Pat. No. 10,642,788.

(51) Int. Cl.
*G06F 16/11* (2019.01)
*G06F 3/06* (2006.01)
*G06F 16/18* (2019.01)

(52) U.S. Cl.
CPC ............ *G06F 16/128* (2019.01); *G06F 3/065* (2013.01); *G06F 3/067* (2013.01); *G06F 3/0619* (2013.01); *G06F 16/1815* (2019.01)

(58) Field of Classification Search
CPC ........ G06F 3/0619; G06F 3/065; G06F 3/067; G06F 16/1815; G06F 16/178
See application file for complete search history.

(56) References Cited

U.S. PATENT DOCUMENTS

| | | | |
|---|---|---|---|
| 7,475,124 B2 | 1/2009 | Jiang et al. |
| 8,327,103 B1 | 12/2012 | Can et al. |
| 8,380,928 B1 | 2/2013 | Chen et al. |
| 8,429,346 B1 | 4/2013 | Chen et al. |
| 8,515,911 B1 | 8/2013 | Zhou et al. |
| 8,539,148 B1 | 9/2013 | Chen et al. |
| 8,566,483 B1 | 10/2013 | Chen et al. |
| 8,583,607 B1 | 11/2013 | Chen et al. |

(Continued)

OTHER PUBLICATIONS

U.S. Appl. No. 15/499,943, filed Apr. 28, 2017, Kucherov et al.

(Continued)

*Primary Examiner* — Aracelis Ruiz
(74) *Attorney, Agent, or Firm* — Daly, Crowley, Mofford & Durkee, LLP

(57) ABSTRACT

A method is disclosed comprising: generating a first snapshot of a first storage subsystem; detecting, by a management node, that all in-flight data storage requests recorded in drain tables of storage nodes in the first storage subsystem have been completed, the in-flight data storage requests recorded in the drain tables of the storage nodes being replicated in a second storage subsystem; causing, by the management node, each of the storage nodes to flip the respective designations of the tracking tables in the node's respective pair of tracking tables; and transmitting, from the management node to the second storage subsystem, an instruction which when received by the second storage subsystem causes the second storage subsystem to generate a second snapshot of the second storage subsystem.

20 Claims, 9 Drawing Sheets

(56) References Cited

U.S. PATENT DOCUMENTS

| | | |
|---|---|---|
| 8,683,153 B1 | 3/2014 | Long et al. |
| 8,712,976 B1 | 4/2014 | Chen et al. |
| 8,775,388 B1 | 7/2014 | Chen et al. |
| 8,782,324 B1 | 7/2014 | Chen et al. |
| 8,799,601 B1 | 8/2014 | Chen et al. |
| 8,909,887 B1 | 12/2014 | Armangau et al. |
| 8,930,746 B1 | 1/2015 | Chen et al. |
| 8,954,699 B1 | 2/2015 | Chen et al. |
| 8,977,812 B1 | 3/2015 | Chen et al. |
| 9,152,336 B1 | 10/2015 | Chen et al. |
| 9,304,889 B1 | 4/2016 | Chen et al. |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,235,066 B1 | 3/2019 | Chen et al. |
| 10,248,623 B1 | 4/2019 | Chen et al. |
| 10,261,853 B1 | 4/2019 | Chen et al. |
| 10,310,951 B1 | 6/2019 | Chen et al. |
| 10,324,640 B1 | 6/2019 | Chen et al. |
| 10,338,851 B1 | 7/2019 | Kronrod et al. |
| 10,353,616 B1 | 7/2019 | Tao et al. |
| 10,359,968 B1 | 7/2019 | Chen et al. |
| 10,374,792 B1 | 8/2019 | Meiri et al. |
| 10,394,485 B1 | 8/2019 | Chen et al. |
| 10,402,283 B1 | 9/2019 | Chen et al. |
| 10,409,493 B1 | 9/2019 | Kucherov et al. |
| 10,459,632 B1 | 10/2019 | Chen et al. |
| 10,459,883 B1 | 10/2019 | Meiri et al. |
| 10,496,489 B1 | 12/2019 | Chen et al. |
| 10,496,668 B1 | 12/2019 | Meiri et al. |
| 10,496,672 B2 | 12/2019 | Meiri et al. |
| 10,565,058 B1 | 2/2020 | Meiri et al. |
| 2006/0020752 A1* | 1/2006 | Schnapp .............. G06F 12/0804 711/113 |
| 2017/0322993 A1* | 11/2017 | Brodt .................. G06F 16/2358 |

OTHER PUBLICATIONS

U.S. Appl. No. 15/499,949, filed Apr. 28, 2017, Chen et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 16/042,363, filed Jul. 23, 2018, Chen et al.
U.S. Appl. No. 16/038,543, filed Jul. 18, 2018, Chen et al.
U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 16/375,001, filed Apr. 4, 2019, Chen et al.
U.S. Appl. No. 16/380,087, filed Apr. 10, 2019, Kronrod et al.
U.S. Appl. No. 16/592,271, filed Oct. 3, 2019, Chen et al.
U.S. Appl. No. 16/592,328, filed Oct. 3, 2019, Barabash et al.
U.S. Appl. No. 16/667,453, filed Oct. 29, 2019, Chen et al.
U.S. Appl. No. 16/668,661, filed Oct. 30, 2019, Kronrod et al.
U.S. Appl. No. 16/743,274, filed Jan. 15, 2020, Chen et al.
U.S. Appl. No. 16/747,169, filed Jan. 20, 2020, Chen et al.
U.S. Appl. No. 16/786,422, filed Feb. 10, 2020, Kronrod et al.
U.S. Appl. No. 16/788,461, filed Feb. 12, 2020, Chen et al.
U.S. Appl. No. 16/773,303, filed Jan. 27, 2020, Hu et al.
U.S. Appl. No. 16/511,676, filed Jul. 15, 2019, Chen et al.
Office Action dated Nov. 13, 2019 for U.S. Appl. No. 16/162,786; 8 pages.
Response to Office Action filed on Nov. 21, 2019 for U.S. Appl. No. 16/162,786; 9 pages.
Notice of Allowance dated Jan. 31, 2020 for U.S. Appl. No. 16/162,786; 9 pages.

* cited by examiner

SAND TIMER ALGORITHM FOR TRACKING IN-FLIGHT DATA STORAGE REQUESTS FOR DATA REPLICATION

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a first storage subsystem having a management node and a plurality of storage nodes, each of the storage nodes having a respective pair of tracking tables for recording in-flight data storage requests, the tracking tables in each pair having different respective designations, the tracking tables in each pair alternating between a drain table designation and an active table designation, the method comprising: generating a first snapshot of the first storage subsystem; detecting, by the management node, that all in-flight data storage requests recorded in the drain tables of the storage nodes have been completed, the in-flight data storage requests recorded in the drain tables of the storage nodes being replicated in a second storage subsystem; causing, by the management node, each of the plurality of storage nodes to flip the respective designations of the tracking tables in the node's respective pair of tracking tables; and transmitting, from the management node to the second storage subsystem, an instruction which when received by the second storage subsystem causes the second storage subsystem to generate a second snapshot of the second storage subsystem, the instruction being transmitted after first snapshot is generated and all in-flight data storage requests recorded in the drain tables of the storage nodes have been completed.

According to aspects of the disclosure, an apparatus is provided for use in a first storage subsystem having a plurality of storage nodes, each of the storage nodes having a respective pair of tracking tables for recording in-flight data storage requests, the tracking tables in each pair having different respective designations, the tracking tables in each pair alternating between a drain table designation and an active table designation, the apparatus comprising: a memory; and at least one processor operatively coupled to the memory, the at least one processor being configured to: generate a first snapshot of the first storage subsystem; detect that all in-flight data storage requests recorded in the drain tables of the storage nodes have been completed, the in-flight data storage requests recorded in the drain tables of the storage nodes being replicated in a second storage subsystem; cause each of the plurality of storage nodes to flip the respective designations of the tracking tables in the node's respective pair of tracking tables; and transmit, to the second storage subsystem, an instruction which when received by the second storage subsystem causes the second storage subsystem to generate a second snapshot of the second storage subsystem, the instruction being transmitted after the first snapshot is generated and all in-flight data storage requests recorded in the drain tables of the storage nodes have been completed.

A non-transitory computer-readable medium is provided that is configured to store one or more processor-executable instructions which when executed by at least one processor cause the at least one processor to perform the operations of: identifying a plurality of storage nodes in a first storage subsystem, each of the storage nodes having a respective pair of tracking tables for recording in-flight data storage requests, the tracking tables in each pair having different respective designations, the tracking tables in each pair alternating between a drain table designation and an active table designation; generating a first snapshot of the first storage subsystem; detecting that all in-flight data storage requests recorded in drain tables of the storage nodes have been completed, the in-flight data storage requests recorded in the drain tables of the storage nodes being replicated in a second storage subsystem; causing each of the plurality of storage nodes to flip the respective designations of the tracking tables in the node's respective pair of tracking tables; and transmitting to the second storage subsystem, an instruction which when received by the second storage subsystem causes the second storage subsystem to generate a second snapshot of the second storage subsystem, the instruction being transmitted after first snapshot is generated and all in-flight data storage requests recorded in the drain tables of the storage nodes have been completed.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
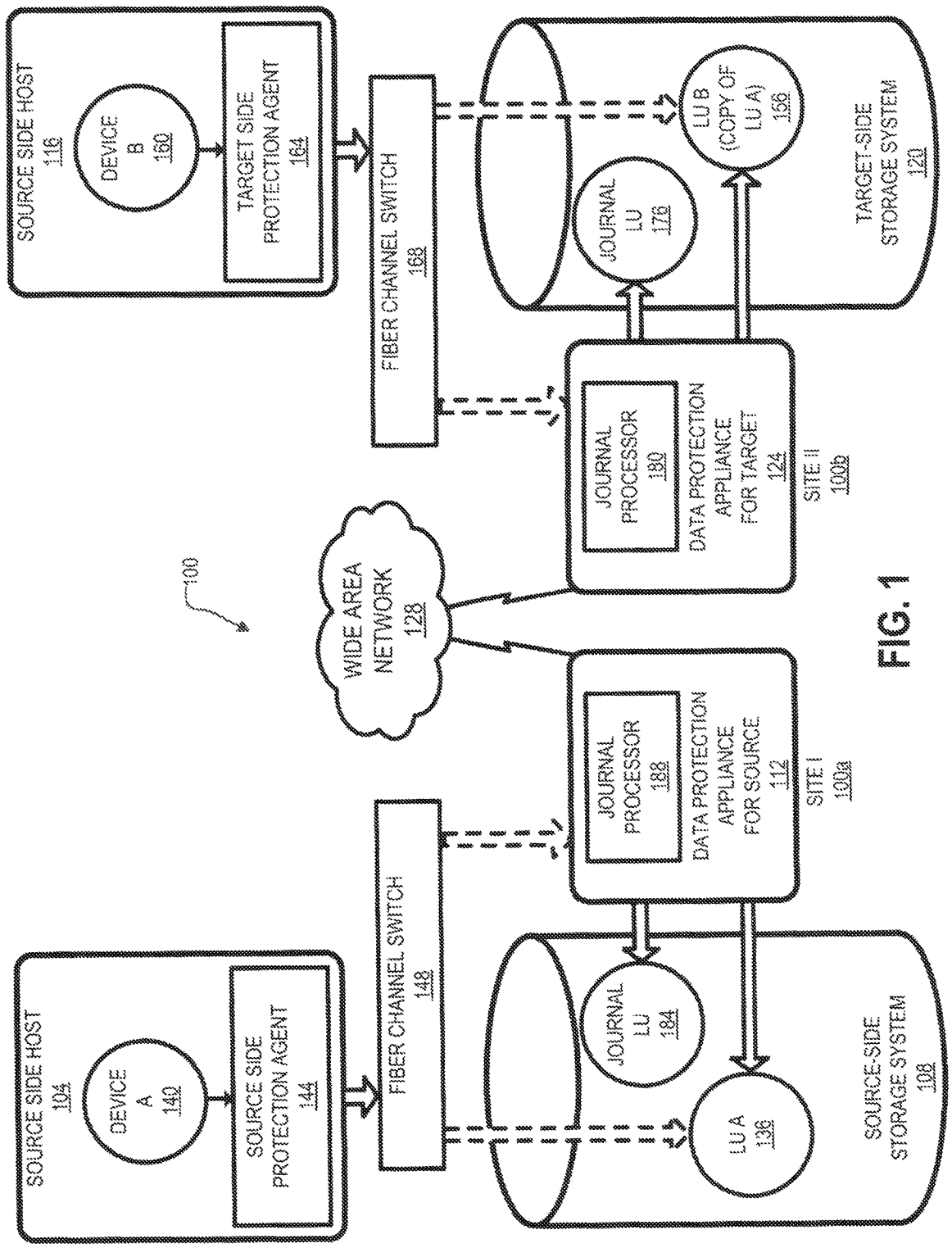
FIG. 1 is a diagram of an example of a distributed storage system, according to aspects of the disclosure.

Referring to the embodiment of FIG. 1, the storage system 100 includes two sites: Site I 100a and Site II 100b. Under normal operation Site I 100a may correspond to a source side (i.e., the transmitter within a data replication workflow) of storage system 100 and Site II 100b may be the target side (i.e., the receiver within a data replication workflow) of the system, as shown in FIG. 1. Thus, during normal operations, the direction of replicate data flow may go from Site I 100a to Site II 100b.

In certain embodiments. Site I and Site II may be remote from one another. In other embodiments, the two sites may be local to one another. In particular embodiments. Site I and Site II may be connected via a local area network (LAN). In other embodiments, the two sites may be connected via a wide area network (WAN) 128, such as the Internet.

In particular embodiments, the data protection system may include a failover mode of operation, wherein the direction of replicated data flow is reversed. In such embodiments, Site I may behave as a target side and Site II may behave as the source side. In some embodiments, failover may be triggered manually (e.g., by a user) or automatically. In many embodiments, failover may be performed in the event of a disaster at Site I. In some embodiments, both Site I and Site II may behave as source side for some stored data and may behave simultaneously as a target site for other stored data. In certain embodiments, a portion of stored data may be replicated from one site to the other, and another portion may not be replicated.

In some embodiments. Site I corresponds to a production site (e.g., a facility where one or more hosts run data processing applications that write data to a storage system and read data from the storage system) and Site II corresponds to a backup or replica site (e.g., a facility where replicated production site data is stored). In such embodiments, Site II may be responsible for replicating production site data and may enable rollback of Site I data to an earlier point in time. In many embodiments, rollback may be used in the event of data corruption of a disaster, or alternatively in order to view or to access data from an earlier point in time.

Referring again to FIG. 1, Site I 100a includes a source host 104, a source storage system (or "storage array") 108, and a source data protection appliance (DPA) 112 coupled via a first storage area network (SAN). Similarly. Site II 100b includes a target host 116, a target storage system 120, and a target DPA 124 coupled via a second SAN. Each SAN may include one or more devices (or "nodes") that may be designated an "initiator," a "target", or both. In the embodiment of FIG. 1, the first SAN includes a first fiber channel switch 148 and the second SAN includes a second fiber channel switch 168. Communication links between each host 104, 116 and its corresponding storage system 108, 120 may be any appropriate medium suitable for data transfer, such as fiber communication channel links. In many embodiments, a host communicates with its corresponding storage system using SCSI commands.

Referring back to FIG. 1, hosts 104 and 116 may each correspond to one computer, a plurality of computers, or a network of distributed computers. In some embodiments, a host may include a processor, volatile memory, non-volatile memory, a data bus, an I/O interface, a display interface and a network interface. In certain embodiments, a host may run at least one data processing application, such as a database application and an e-mail server.

Referring again to FIG. 1, each storage system 108, 120 may include storage devices for storing data, such as disks or arrays of disks. In some embodiments, the storage systems may be target nodes. In certain embodiments, in order to enable initiators to send requests to a storage system, the storage system may expose one or more logical units (LU) to which commands are issued. In many embodiments, the storage systems may be SAN entities that provide multiple LUs for access by multiple SAN initiators. In many embodiments, an LU is a physical or virtual logical entity provided by a storage system for accessing data stored therein. In some embodiments, an LU may be a virtual disk accessed by a virtual machine. In certain embodiments, an LU may be identified by a unique logical unit number (LUN).

In the embodiment of FIG. 1, storage system 108 exposes a logical unit 136, designated as LU A, and storage system 120 exposes a logical unit 136, designated as LU B. LU B may be used for replicating LU A. As such. LU B may be generated as a copy of LU A. In one embodiment. LU B may be configured so that its size is identical to the size of LU A.

Referring back to FIG. 1, the source host 104 generates a host device 140 ("Device A") corresponding to LU A and the source host 116 generates a host device 160 ("Device B") corresponding to LU B. In many embodiments, a host device is a logical entity within a host through which the host may access an LU. In some embodiments, an operating system of a host may generate a host device for each logical unit exposed by a storage system in the host SAN.

Referring again to FIG. 1, the source host 104 is configured to act as a SAN initiator that issues I/O requests through host device 140 to LU 156 ("LU A"). In some embodiments, the I/O requests include SCSI commands. In many embodiments, an I/O request includes an address that includes a specific device identifier, an offset within the device, and a data size.

Referring back to FIG. 1, the source DPA 112 and target DPA 124 may perform various data protection services, such as data replication of a storage system, and journaling of I/O requests issued by the hosts 104, 116. When acting as a target DPA, a DPA may also enable rollback of data to an earlier point-in-time (PIT), and processing of rolled back data at the target site. Each DPA 112, 124 may be a physical device, a virtual device running, or a combination of a virtual and physical device.

In some embodiments, a DPA may be a cluster of such computers. In many embodiments, a cluster may ensure that if a DPA computer is down, then the DPA functionality switches over to another computer. In some embodiments, computers within a DPA cluster may communicate with one another using at least one communication link suitable for data transfer via fiber channel or IP based protocols, or such other transfer protocol. In certain embodiments, one computer from the DPA cluster may serve as the DPA leader that coordinates other computers in the cluster, and may also perform other tasks that require coordination between the computers, such as load balancing.

In certain embodiments, a DPA may be a standalone device integrated within a SAN. In other embodiments, a DPA may be integrated into a storage system. In some embodiments, the DPAs communicate with their respective hosts through communication lines such as fiber channels using, for example, SCSI commands or any other protocol.

In various embodiments, the DPAs may be configured to act as initiators in the SAN. For example, the DPAs may issue I/O requests using to access LUs on their respective storage systems. In some embodiments, each DPA may also be configured with the necessary functionality to act as targets, e.g., to reply to I/O requests, such as SCSI commands, issued by other initiators in the SAN, including their respective hosts. In certain embodiments, the DPAs, acting as target nodes, may dynamically expose or remove one or more LUs.

Referring again to FIG. 1, as described herein above. Site I and Site II may each behave simultaneously as a production site and a backup site for different logical units. As such, DPA 112 and DPA 124 may each behave as a source DPA for some LUs, and as a target DPA for other LUs, at the same time.

In the embodiment of FIG. 1, hosts 104 and 116 include protection agents 144 and 164, respectively. Protection agents 144 and 164 are configured to intercept SCSI commands issued by their respective hosts to LUs via host devices (e.g. host devices 140 and 160). A protection agent may act on an intercepted SCSI command issued to a logical unit, in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. A protection agent 144, 164 may handle different SCSI commands, differently, according to the type of the command. For example, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. In certain embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. In particular embodiments, when a DPA behaves as a target device for a certain LU, then during normal course of operation, the associated protection agent fails I/O requests issued by the host to the host device corresponding to that LU.

Referring back to FIG. 1, communication between a protection agent 144, 164 and its respective DPA 112, 124 may use any protocol suitable for data transfer within a SAN, such as fiber channel, or SCSI over fiber channel. The communication may be direct, or via a logical unit exposed by the DPA.

In certain embodiments, protection agents may be drivers located in their respective hosts. Alternatively, a protection agent may also be located in a fiber channel switch, or in any other device situated in a data path between a host and a storage system or on the storage system itself. In a virtualized environment, the protection agent may run at the hypervisor layer or in a virtual machine providing a virtualization layer.

Referring again to FIG. 1, the target storage system 120 exposes a journal LU 176 for maintaining a history of write transactions made to LU 156, referred to herein as a "journal." A journal may be used to provide access to storage at specified points in time, as discussed further below in conjunction with FIG. 2. In some embodiments, the journal may be stored across multiple LUs (e.g., using striping).

In the embodiment of FIG. 1, the target DPA 124 includes a journal processor 180 for managing the journal within LU 176. The journal processor 180 is configured to manage the journal entries of LU B 156. Specifically, journal processor 180 may enter write transactions received by the target DPA 124 from the source DPA 112 into the journal by writing them into the journal LU 176, read the undo information for the transaction from LU B 156, update the journal entries in the journal LU 176 with undo information, apply the journal transactions to LU B 156, and remove already-applied transactions from the journal.

In one embodiment, the journal processor 180 may be configured to perform processing described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Embodiments of the data replication system may be provided as physical systems for the replication of physical LUs. or as virtual systems for the replication of virtual LUs. In one embodiment, a hypervisor may consume LUs and may generate a distributed file system on the logical units such as VMFS, for example, generates files in the file system and exposes the files as LUs to the virtual machines (each virtual machine disk is seen as a SCSI device by virtual hosts). In another embodiment, a hypervisor may consume a network-based file system and exposes files in the NFS as SCSI devices to virtual hosts.

Referring back to FIG. 1, in normal operation (sometimes referred to as "production mode"), the DPA 112 acts as a source DPA for LU 136 ("LU A"). Thus, protection agent 144 is configured to act as a source protection agent, specifically by splitting I/O requests to host device 140 ("Device A"). The protection agent 144 may send an I/O request to source DPA 112 and, after receiving an acknowledgement therefrom, may send the I/O request to LU 136. After receiving a second acknowledgement from storage system 108, the host 104 may acknowledge that the I/O request has successfully completed.

When source DPA 112 receives a replicated I/O request from protection agent 144, source DPA 112 may transmit certain I/O information characterizing the write request, packaged as a "write transaction", over WAN 128 to the target DPA 124 for journaling and for incorporation within target storage system 120. When applying write operations to storage system 120, the target DPA 124 may act as an initiator, and may send SCSI commands to LU 156 ("LU B").

The source DPA 112 may send its write transactions to target DPA 124 using a variety of modes of transmission, including inter alia (i) a synchronous mode, (ii) an asynchronous mode, and (iii) a batch mode. In synchronous mode, the source DPA 112 may send each write transaction to the target DPA 124, may receive back an acknowledgement from the target DPA 124, and in turns may send an acknowledgement back to protection agent 144.

In synchronous mode, protection agent 144 may wait until receipt of such acknowledgement before sending the I/O request to LU 136. In asynchronous mode, the source DPA 112 may send an acknowledgement to protection agent 144 upon receipt of each I/O request, before receiving an acknowledgement back from target DPA 124.

In batch mode, the source DPA 112 may receive several I/O requests and combines them into an aggregate "batch" of write activity performed in the multiple I/O requests, and may send the batch to the target DPA 124, for journaling and for incorporation in target storage system 120. In batch mode, the source DPA 112 may send an acknowledgement to protection agent 144 upon receipt of each I/O request, before receiving an acknowledgement back from the target DPA 124.

As discussed above, in normal operation. LU B 156 may be used as a backup of LU A 136. As such, while data written to LU A by host 104 is replicated from LU A to LU B, the target host 116 should not send I/O requests to LU B. To prevent such I/O requests from being sent, protection agent 164 may act as a target side protection agent for host device B 160 and may fail I/O requests sent from host 116 to LU B 156 through host device B 160.

Still referring to FIG. 1, in recovery mode, the target DPA 124 may undo the write transactions in the journal LU 176 so as to restore the target storage system 120 to an earlier state.

Figure 2:
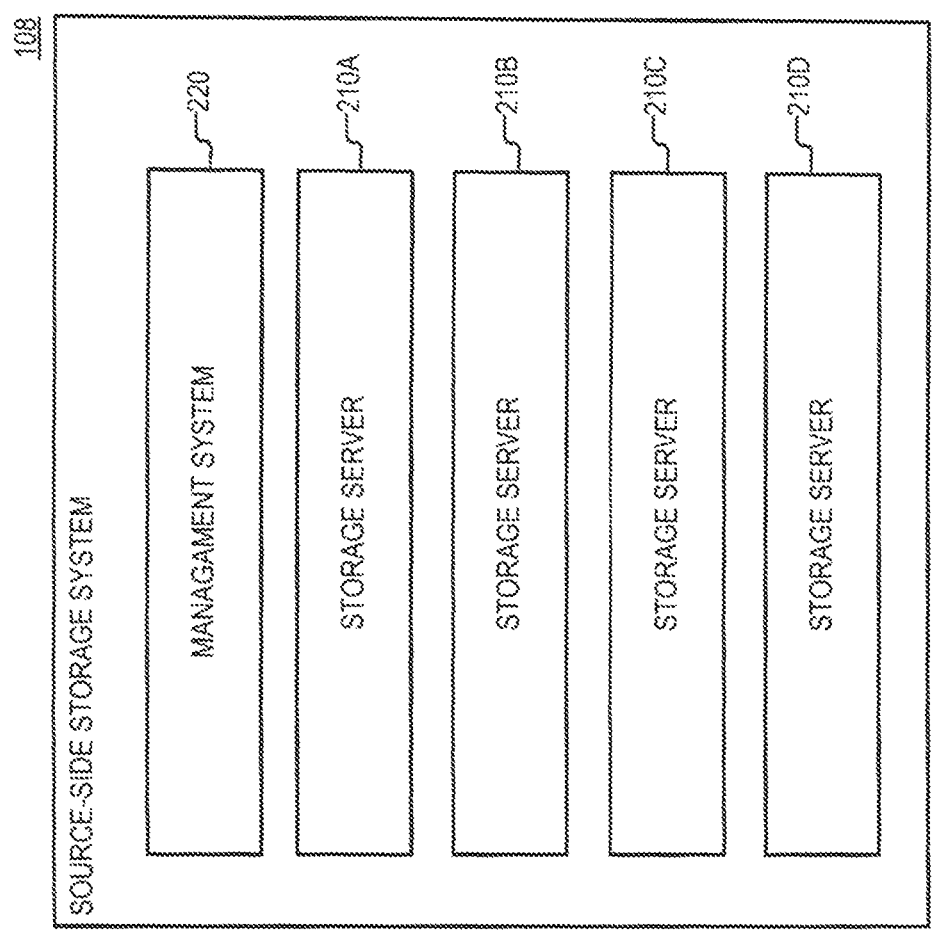
FIG. 2 is a diagram of an example of a source side storage system that is part of the distributed storage system of FIG. 1, according to aspects of the disclosure.

FIG. 2 is a diagram of the storage system 108, according to aspects of the disclosure. The system 108 may include a plurality of storage servers 210 and a management system 220 that are coupled to one another in a network (e.g., a mesh network). The network may include an InfiniBand network, a TCP/IP network, and/or any other suitable type of network. As is discussed further below, each of the storage servers 210 may include a multi-core processor that is running a BLOCK software stack on one of its cores. The BLOCK software stack may be configured to instantiate I/O service processes, which are sometimes also referred as a TRUCK processes, on at least some of the remaining cores of the multi-core processor. As is further discussed below, each I/O service process may include any suitable type of process that is configured to execute (either partially or fully) incoming I/O requests, as well as perform additional operations related to data storage and retrieval.

Figure 3:
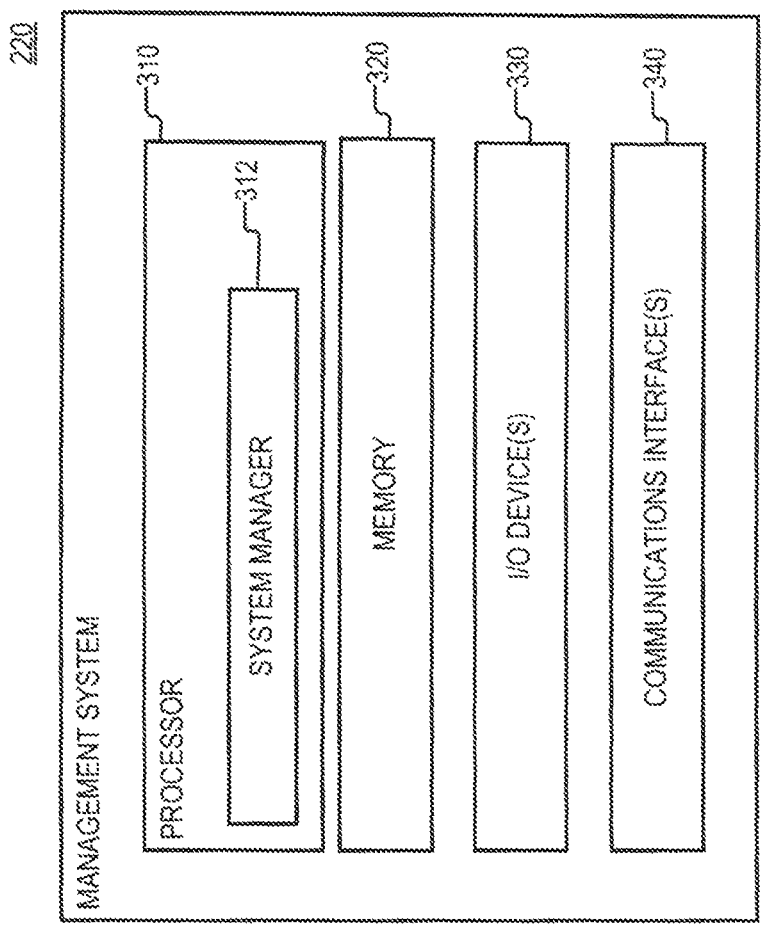
FIG. 3 is a diagram of an example of a management system that is part of the source side storage system of FIG. 2, according to aspects of the disclosure.

FIG. 3 is a diagram of an example of the management system 220, according to aspects of the disclosure. As illustrated, the management system 220 may include one or more processors 310, a memory 320. I/O device(s) 330, and communications interface(s) 340 that are operatively coupled to one another. The processor 310 may include any of one or more general-purpose processors (e.g., x86 processors. RISC processors, ARM-based processors, etc.), one or more Field Programmable Gate Arrays (FPGAs), one or more application specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The I/O device(s) 330 may include any suitable type of input and/or output device, such as one or more mice, one or more keyboards, one or more microphones, or one more display screens, for example. The communications interface(s) 340 may include any suitable type of communications interface, such as one or more Ethernet adapters, one or more Wi-Fi adapters (e.g., 802.1414 adapters), and one or more Long-Term Evolution (LTE) adapters, for example.

In some implementations, the management system 220 may be configured to execute a system manager 312. The system manager may include one or more processes that are arranged to coordinate the generation of snapshots between the storage system 108 and the storage system 120. In some implementations, the system manager 312 may be arranged to coordinate the generation of snapshots by performing the process 800, which is discussed further below with respect to FIG. 8. Although in the present example the system manager 312 is implemented in software, alternative implementations are possible in which the system manager 312 is implemented in hardware or as a combination of software and hardware. Although in the present example, the system manager 312 is implemented in the management system 220, it will be understood that the system manager may be implemented in any suitable node of the storage system 100. For example, the system manager 312 may be implemented in one of the storage servers 210 or the data protection appliance 112. Stated succinctly, the present disclosure is not limited to the system manager 312 being executed on any specific node in the storage system 100.

Figure 4:
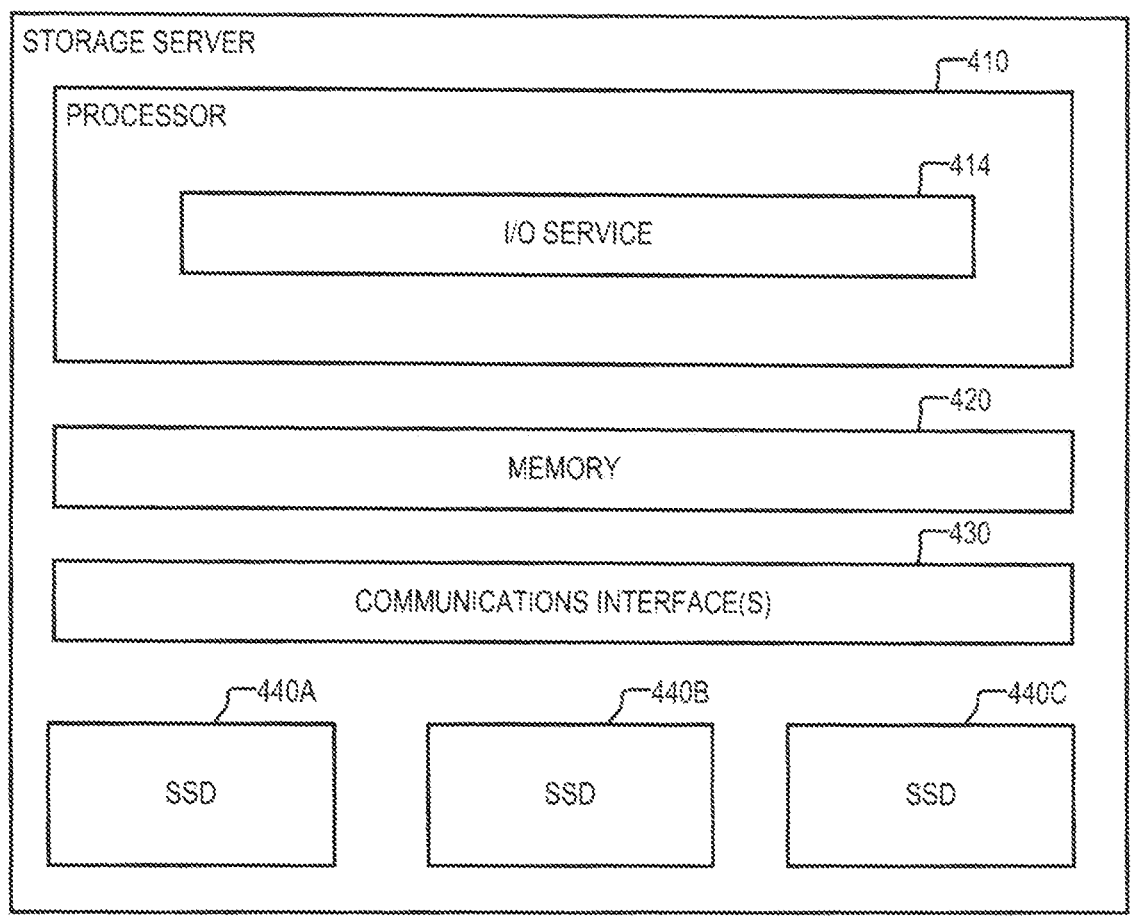
FIG. 4 is a diagram of an example of a storage server that is part of the source side storage system of FIG. 2, according to aspects of the disclosure.

FIG. 4 is a diagram of an example of the storage server 210A, according to aspects of the disclosure. As illustrated, the storage server 210 may include a processor 410, a memory 420, a communications interface(s) 430, and a plurality of storage devices that are operatively coupled to one another. The processor 410 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 420 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 430 may include any suitable type of communications interface, such as one or more Ethernet adapters, one or more Wi-Fi adapters (e.g., 802.1414 adapters), and one or more Long-Term Evolution (LTE) adapters, for example. The storage devices 440 may be configured to form at least a portion of the LU 108. In the present example, the storage devices 440 are solid state drives (SSD). However, alternative implementations are possible, in which at least one of the storage devices is a spinning hard disk (HD), a flash driver, a Read-Only Memory (ROM), a Random-Access Memory (RAM), and/ or any other suitable type of volatile and non-volatile memory.

Although FIG. 4 is presented in the context of the storage server 210A, it will be understood that any other storage server in the storage array 108 has the same or similar configuration as the storage server 210A. Moreover, it will be understood that further implementations are possible in which at least two of the storage servers 210 have different hardware configurations. Stated succinctly, the present disclosure is not limited to any specific configuration for any of the storage servers 210.

Figure 5:
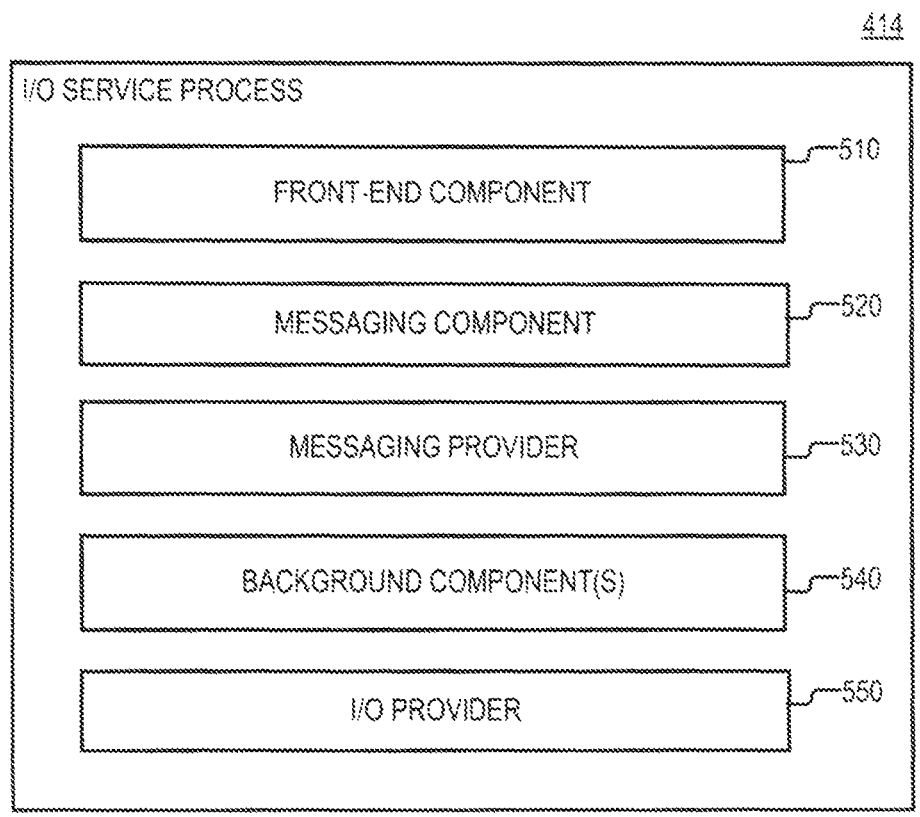
FIG. 5 is a diagram of an I/O service process that is executed by the storage server of FIG. 4, according to aspects of the disclosure.

FIG. 5 is a diagram of the I/O service process 414, which is executed on the processor 410 of the storage server 210A. As illustrated, the I/O service process 414 may include a frontend component 510, a messaging component 520, the messaging provider 530, the background component(s) 540, and I/O provider(s) 550. The frontend component 510 may be configured to pull I/O requests from the I/O pool 312 for execution by the I/O provider(s) 550. The messaging component 520 may include any suitable type of software component that is configured to send and receive messages from storage servers 210, other than the storage server on which the messaging component 520 is executed. The messaging provider 530 may be configured to poll the messaging component 520 for received messages and/or process the received messages. The background component(s) 540 may include one or more components configured to perform background functions that are normally found in storage systems, such as defragmentation, and RAID rebuild, etc.

The I/O provider(s) 550 may include one or more I/O providers that are executed on the processor 410. Each of the I/O providers may be configured execute incoming I/O requests that incident on the storage system 100, the storage server 210A, and/or the I/O service process 414. In some implementations, each I/O provider may be arranged to fully execute incoming I/O requests. Alternatively, in some implementations, each I/O provider may be configured to partially execute an I/O request by implementing a particular stage of an I/O request fulfillment pipeline. Stated succinctly, the present disclosure is not limited to any specific implementation of the I/O provider(s) 550.

In the present example, each of the frontend component 510, the messaging component 520, the messaging provider 530, the background component(s) 540, and the I/O provider(s) 550 is implemented as a separate thread that is instantiated by and executed within the user space of the I/O service process 414. However, alternative implementations are possible in which any of the frontend component 510, the messaging component 520, the messaging provider 530, the background component(s) 540, and the I/O provider(s) 550 is executed outside of the user space of the I/O service process 414. For the purposes of the present disclosure, the terms "process" and "thread" may be used interchangeably to refer to a sequence of processor-executable instructions that can be managed independently by a scheduler that is part of an operating system and/or another type of scheduler that is itself managed by the operating system scheduler.

Figure 6:
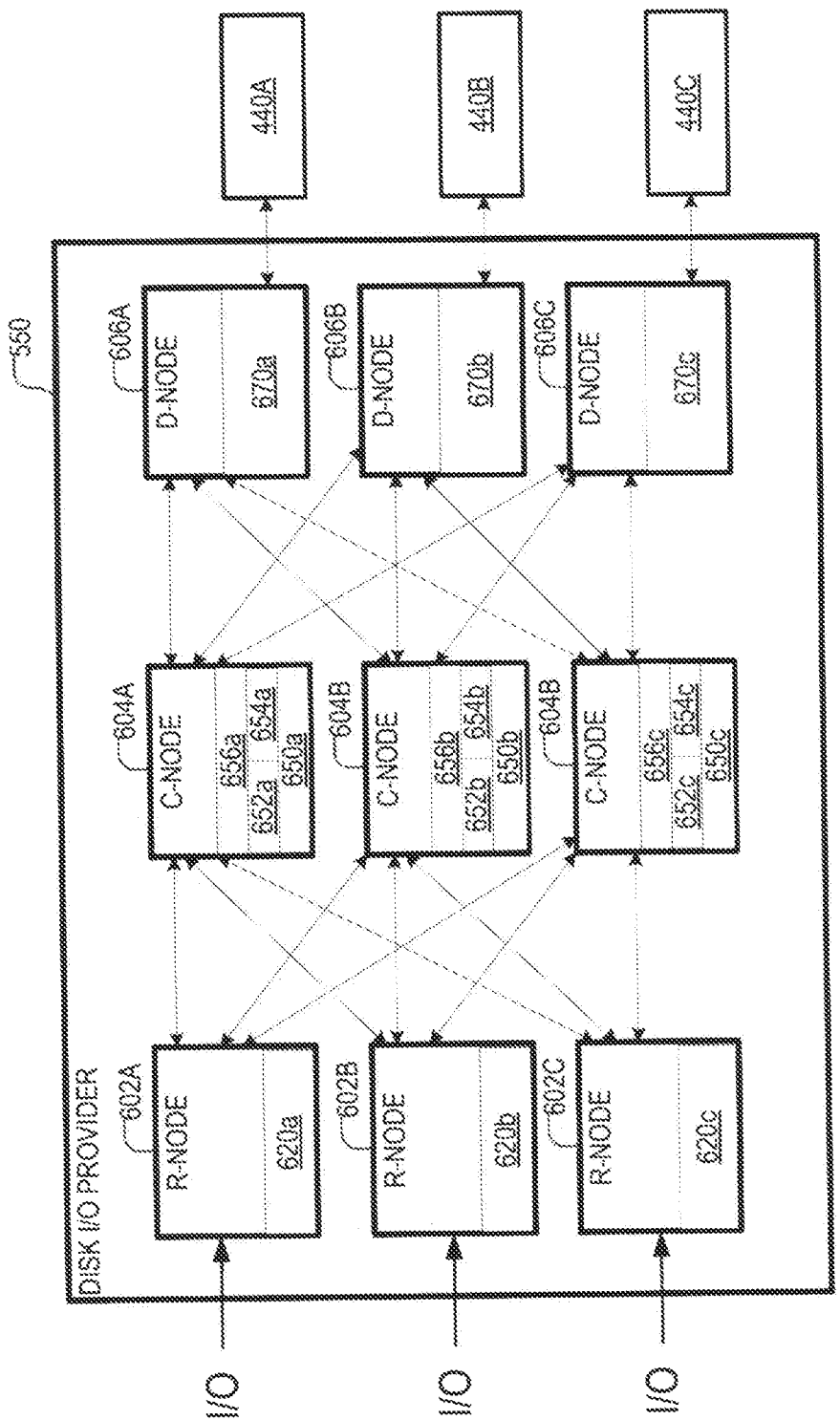
FIG. 6 is a diagram of an example of a disk I/O provider that is executed within the I/O service process of FIG. 5, according to aspects of the disclosure.

FIG. 6 is diagram illustrating an example of one particular implementation of the I/O provider(s) 550. According to the present example, the I/O provider(s) 550 includes I/O providers 602, 604, and 606, which are herein referred to as routing nodes, control nodes, and data nodes respectively.

The routing nodes 602 may be configured to terminate I/O requests received at the storage system 100 and route them to appropriate control nodes 604 and data nodes 606 for further execution. In doing so, the routing nodes 602 may distribute a workload over multiple control nodes 604 and data nodes 606. In some implementations, any of the routing nodes 602 may be configured to write I/O requests (e.g., SCSI I/O requests) to selected ones of the control nodes 604 for further processing. In some implementations, each of the routing nodes 602 may be provided with a respective address-to-control-module (A2C) table 620 that identifies a plurality of control nodes (e.g., the control nodes 604) and a different respective LDA range that is managed by each of the control nodes. In this regard, the A2C table 620 may define a plurality of logical spaces that are managed by different control nodes 604. In the present example, a copy of the A2C table 620 is stored on each of the routing nodes 602. However, it will be understood that the present disclosure is not limited to any specific method for allocating respective logical spaces to the control nodes 604.

The control nodes 604 may be configured to control the execution of control node commands supplied by the routing nodes 602. The control node commands may be used to implement read requests, write requests, and/or any other suitable I/O request. In addition, each of the control nodes 604 may maintain and manage key metadata elements. Each of the control nodes 604 may be configured to receive control node commands from the routing nodes and communicate with the data nodes 606 to execute the commands. In some implementations, each control node 604 may maintain an address-to-data node table (H2D) table 650 that identifies a plurality of data nodes and a different respective hash digest range that is associated with each of the data nodes. In this regard, the H2D table may effectively define a plurality of logical spaces that are managed by different data nodes 606. In the present example, a copy of the H2D table is stored on each of the control nodes 604.

The control nodes 604 may be further configured to maintain respective pairs of tracking tables 652-654 and an active table pointer 656. Each of the tracking tables 652 and 654 in a pair may be designated as either an active table or a drain table. Each of the tracking tables 652 and 654 may be a hash table and/or any other suitable type of table. Furthermore, each of the tracking tables 652 in any given control node 604 may be configured to store identifiers corresponding to in-flight control node commands that are received at the given control node 604. The active table pointer 656 may be a variable or data structure that is used to reference either one of the tracking tables 652 and 654. For example, the active table pointer 656 may be configured to identify the tracking table 652 by setting the active table pointer 656 to a first value. As another example, the active table pointer 656 may be configured to identify the tracking table 654 by setting the active table pointer 656 to a second value.

The data nodes 606 may be configured to control the execution of data node commands supplied by the control nodes 604. Each of the data nodes 606 may be attached to one or more of the storage devices 440. Each of the data nodes may store in memory a hash-to-physical-address (H2P) table 670. The H2P table 670 may identify a plurality of physical addresses in the storage devices 440, and different respective hash digest that is mapped to each of the physical addresses. In this regard, the H2P table 670 may be used to map hash digests received from the control nodes to different physical locations in the volumes 160 managed by the data nodes 606. In the present example, each of the data nodes 606 includes a different table H2P table 670 that is specific to that data node.

In operation, any of the routing nodes 602 may receive an I/O request that spans a range of logical data addresses (LDAs). The request may include a block of data and an opcode identifying an action that is required to be performed. In response to the request, the routing node 602 may use its respective A2C table to identify a plurality of control nodes 604 based on the A2C table. Afterwards, the routing node 602 may decompose the I/O request into a plurality of control node commands and forward the control node commands to the identified control nodes 604 for further processing.

In operation, any of the control nodes 604 may receive a control node command that is generated by one of the routing nodes 602. The control node command may include a data payload and an opcode identifying an action that is required to be performed. Upon receiving the control node command, the control node 604 may decompose the control node command into a plurality of data node commands and forward each of the data node commands. In some implementations, each of the data node commands may include a different page of data along with a hash digest of the page. Each data node command may then be forwarded to a respective data node 606 that is selected based on the H2D table 650 and the data node command's hash digest (i.e., the data node responsible for managing the range of hash digests which the data node command's respective hash digest falls into).

Furthermore, in operation, each of the control nodes 604 may cooperate with the system manager 312 to generate snapshots of Site I 100a and Site II 100b of the storage system 100, that are synchronized with one another. In cooperating with system manager 312 each of the storage nodes may execute the process 700, which is discussed below with respect to FIG. 7, while the system manager 312 executes the process 800, which is discussed below with respect to FIG. 8. In some aspects, the respective pair of tracking tables 652 and 654 of each of the control nodes 604 and the active table pointer 656 may be used by the control node to track in-flight control node commands that are received at the control node 604 in the manner discussed with respect to the process 700.

In operation, any of the data nodes 606 may receive a data node command that is generated by one of the control nodes 604. Next, the data node 606 may search its respective H2P table to identify a physical address in one of the storage devices 440 that corresponds to the hash digest that is contained in the data node command. Afterwards, the data node 606 may store the payload of the data node command (i.e., the page of data contained in the data node command) at the identified physical address.

Figure 7A:
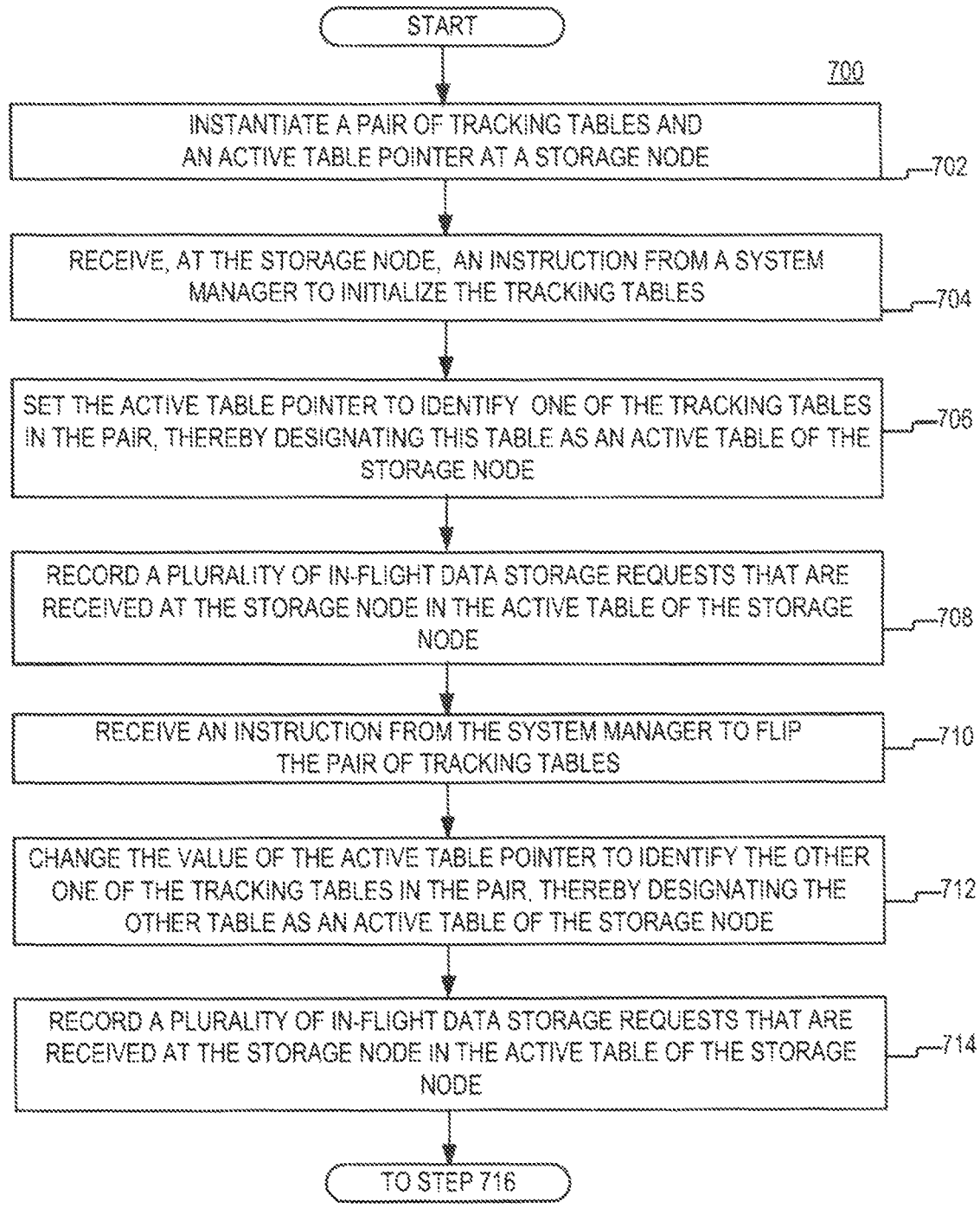
FIG. 7A is a flowchart of the first portion of a process for tracking in-flight data storage request at a storage node, according to aspects of the disclosure.
Figure 7B:
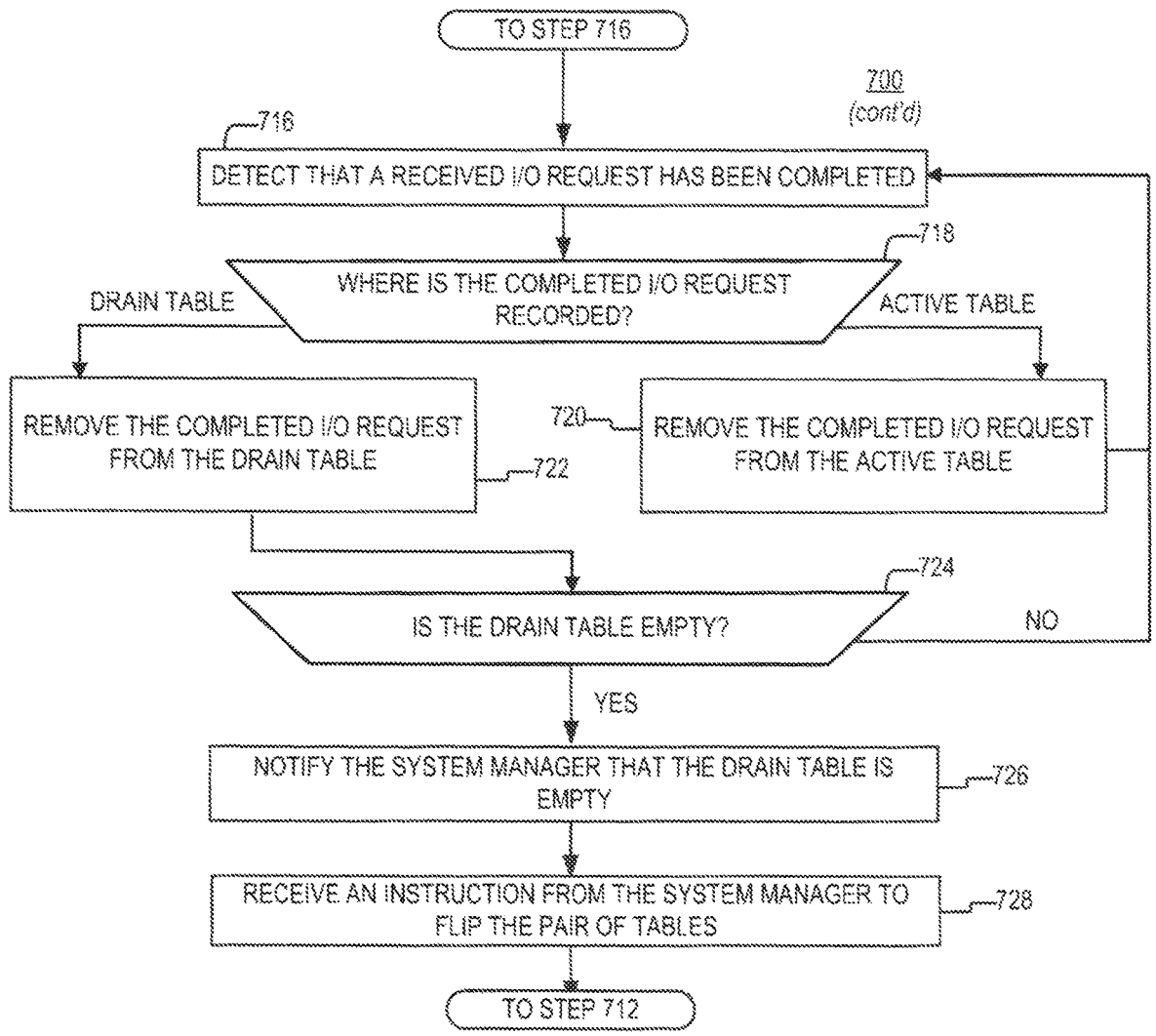
FIG. 7B is a flowchart of a second portion of the process of FIG. 7A, according to aspects of the disclosure.

FIGS. 7A-B show an example of a process 700 for tracking in-flight data storage requests that are received at a storage node of a storage subsystem, according to aspects of the disclosure.

At step 702, a pair of tracking tables and an active table pointer are instantiated by the storage node. According to the present example, the tracking tables include hash tables, however alternative implementations are possible in which the tracking tables include any suitable type of data structure, or a set of data structures, for storing a plurality of identifiers. The storage node may include any suitable type of storage node. According to the present example, the storage node includes a node that is configured to implement a particular stage in a pipeline for executing I/O requests, such as any of the storage nodes 602-606, which are discussed with respect to FIG. 6. However, alternative implementations are possible in which the storage node includes a storage node arranged to execute I/O requests on its own (e.g., without cooperating with other storage nodes). According to the present example, the storage node may be implemented as one or more processes (or threads) that are executed on a computing device, such as the storage server 210A, which is discussed with respect to FIG. 4. Although in the present example, the storage node is implemented in software, alternative implementations are possible in which the storage node is implemented in hardware, or as a combination of software and hardware. Stated succinctly, it will be understood that the present disclosure is not limited to any specific implementation of the storage node.

At step 704, the storage node receives an instruction from a system manager to initialize the pair of tracking tables.

At step 706, in response to receiving the instruction to initialize the pair of tracking tables, the storage node sets the value of the active table pointer to identify (e.g., to reference) one of the tracking tables. Setting the active table pointer to identify one of the tracking tables in the pair effectively designates that tracking table as an active table of the storage node, and designates the other tracking table in the pair as a drain table of the storage node. As is discussed further below, the active table of the storage node may be one where in-flight data storage requests that arrive at the storage node are recorded. By contrast, the drain table of a storage node may be one in which no in-flight data storage requests are being recorded until the pair of tracking tables is flipped. As is further discussed below, after step 706 is executed and onwards, one of the tracking tables in the pair is always designated as an active table of the storage node, and the other one of the tracking tables in the pair is designated as the storage node's drain table. The designations of the tracking tables in the pair may alternate at the same time in response to instructions from the management system, such that when one of the tracking tables transitions from being designated as the active table of the storage node to being designated as the storage node's drain table, the other tracking table transitions from being designated as the drain table of the storage node to being designated as the storage node's active table.

At step 708, a plurality of in-flight data storage requests is recorded in the active table of the storage node. In some implementations, the in-flight requests may be received sequentially and recorded in the active table, in the order of their arrival or in a different order. According to aspects of the disclosure, recording an in-flight data request in the active table of the storage node may include storing, in the active table, an identifier corresponding to the request. In some implementations, the identifier may be an address associated with the in-flight request, or a portion of the address. However, it will be understood the present disclosure is not limited to using any specific type of identifier for identifying in-flight data storage requests.

As used throughout the disclosure, the term "in-flight" may refer to a storage request that has been received by the storage node, but has not been completed yet. In this regard, in-flight data storage requests may be requests whose processing by the storage node has begun, but which have not yet been completed. Furthermore, any of the data storage requests received at the storage node may include any suitable type of request, command, or instruction, which when received at the storage node causes the storage node to write or move data in the storage subs) stem, either alone or by cooperating with other nodes in the storage subsystem. In some implementations, any of the data storage requests may be an I/O request that is received at the storage subsystem from a client device (or a storage system host). Additionally or alternatively, in some implementations, the data storage requests may be a node command that is generated by decomposing (one or more times) an I/O request that is received at the storage subsystem from a client device (or a storage system host). Examples of commands that are generated by decomposing I/O requests may include the control node commands or the data node commands, both of which are discussed with respect to FIG. 6. For the purposes of the present example, the in-flight data storage requests are requests generated by decomposing larger I/O requests.

At step 710, the storage node receives an instruction from the system manager to flip the tracking tables in the pair.

At step 712, in response to the instruction to flip the pair of tracking tables, the value of the active table pointer is changed to reference the other one of the tracking tables in the pair, which was not referenced by the active table pointer before step 712 is executed. According to the present example, changing the value of the active table pointer to identify the other one of the tracking tables in the pair effectively causes the respective designations of the pair of tracking tables to flip, such that what used to be the storage node's active table before step 712 is executed becomes the storage node's drain table, and what used to be the storage node's drain table becomes the active table of the storage node. As a result of the flip, in-flight data storage requests stop being recorded in the old active table (i.e., the tracking table designated as active table before step 712 is executed), and begin being recorded in the new active table (i.e., the table that becomes designated as active table when step 712 is executed). As noted above, when a tracking table in the pair is designated as a drain table, data storage requests stop being recorded in that tracking table.

At step 714, a plurality of in-flight data storage requests are recorded in the active table of the storage node (i.e., the table that is currently being identified by the active table pointer). In some implementations, the in-flight requests may be received sequentially and recorded in the active table of the storage node, in the order of their arrival or in a different order. Step 714 may be performed in the same or similar manner to step 708.

At step 716, the storage node detects that one of the data storage requests recorded in one of the tracking tables in the pair has been completed.

At step 718, the storage node identifies the tracking table where the completed data storage request is recorded. If the completed data storage request is recorded in the active table of the storage node, the process proceeds to step 720. Otherwise, if the completed data storage request is recorded in the drain table of the storage node, the process proceeds to step 722. As noted above, the active table of the storage node may be one of the pair of tracking tables that is currently identified by the active table pointer, and the drain table of the storage node may be the other one of the pair of tracking tables.

At step 720, the completed data storage request is removed from the active table of the storage node and the process 700 returns to step 716. In some implementations, removing the completed data storage request may include deleting an identifier corresponding to the completed data storage request from the active table of the storage node. Additionally or alternatively, in some implementations, removing the completed data storage request from the active table of the storage node may include setting off a flag indicating that an identifier corresponding to the completed data storage request is dirty.

At step 722, the completed data storage request is removed from the drain table of the storage node. In some implementations, removing the completed data storage request may include deleting an identifier corresponding to the completed data storage request from the drain table of the storage node. Additionally or alternatively, in some implementations, removing the completed data storage request from the drain table of the storage node may include setting off a flag indicating that an identifier corresponding to the completed data storage request is dirty.

At step 724, the storage node detects whether the drain table of the storage node is empty. According to the present example, the drain table of the storage node is empty when the all in-flight requests that have been recorded in the drain table (i.e., prior to the drain table being designated as such) have been completed. In some implementations, the drain table of the storage node may be empty when it contains no identifiers corresponding to in-flight data storage requests. Additionally or alternatively, in some implementations, the drain table of the storage node may be empty when all identifiers recorded in it are marked as dirty.

At step 726, the storage node transmits a message to the system manager indicating that the drain table of the storage node is empty.

At step 728, the storage node receives an instruction from the system manager to flip the tracking tables in the pair, and the process 700 returns to step 712, where the pair of tracking tables is flipped again. As a result of the flip, the emptied drain table of the source node becomes designated as an active table, what used to be the active table of the storage becomes designated as the storage node's drain table, and steps 714-728 are repeated again for the new configuration of the pair of tracking tables.

Figure 8:
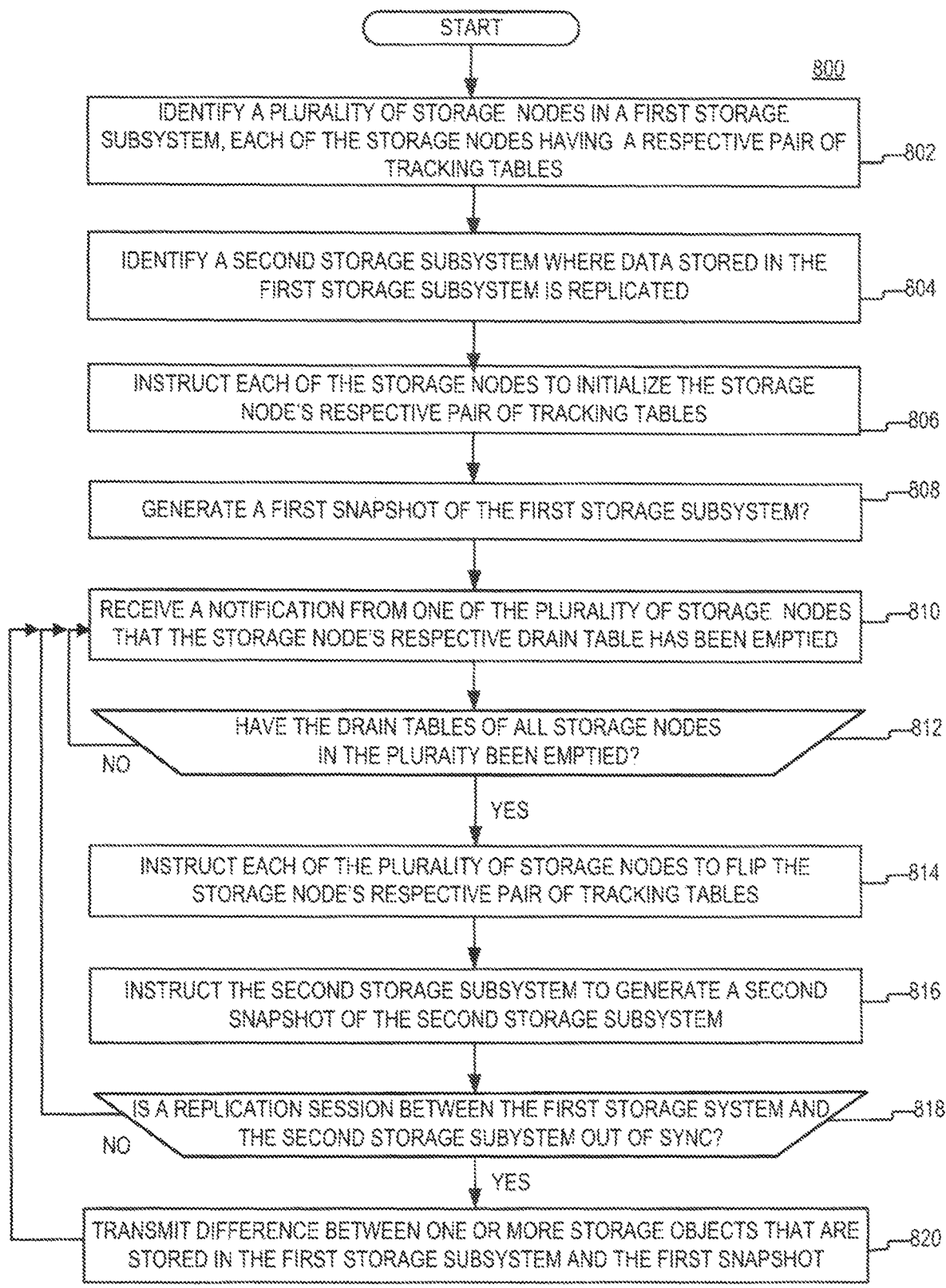
FIG. 8 is a flowchart of an example of a process for generating snapshots, according to aspects of the disclosure.

FIG. 8 is a diagram of an example of a process 800 for generating snapshots, according to aspects of the disclosure.

At step 802, a system manager identifies a plurality of storage nodes in a first storage subsystem. In some implementations, identifying the plurality of storage nodes may include retrieving (or otherwise accessing) a set of identifiers from a memory, wherein each of the identifiers corresponds to a different one of the plurality of storage nodes. According to the present example, each of the plurality of storage nodes is configured to execute the process 700. Furthermore, any of the storage nodes may be the same or similar the storage node discussed with respect to FIGS. 7A-B, and it may be provided with a pair of tracking tables that are arranged to alternate between being designated as the storage node's active table and being designated as the storage node's drain table. In some implementations, each of the plurality of storage nodes may be executed on the same storage server of the first storage subsystem. Additionally or alternatively, in some implementations, at least two of the plurality of storage nodes may be executed on different storage servers of the first storage subsystem.

At step 804, the system manager identifies a second storage subsystem that is configured to provide data replication services to the first storage subsystem. In some implementations, the first storage subsystem and the second storage subsystem may be different parts of the same storage system. For example, in some implementations, the first storage subsystem may be the same or similar to Site I 100a of the storage system 100, and the second storage subsystem may be the same or similar to Site II 100b of the storage system 100. Additionally or alternatively, in some implementations, the first storage subsystem may store data associated with incoming I/O requests, and the second storage subsystem may store replicas of the data. In some implementations, the replication of data by the second storage subsystem may be performed synchronously with the storage of the data in the first storage subsystem. According to the present example, the system manager includes one or more processes that are executed by a management system that is part of the first storage subsystem. The management system may be the same or similar to the management system 220. However, alternative implementations are possible in which, the system manager is executed on any suitable computing unit that is part of the first storage subsystem, such as at least one of a storage server that is part of the first storage subsystem or a digital protection appliance (DPA) that is part of the first storage subsystem. Although the system manager in the present example is implemented in software, alternative implementations are possible in which the system manager is implemented in hardware or as a combination of software and hardware.

At step 806, the system manager instructs each of the plurality of storage nodes to initialize the node's respective pair of tracking tables. In doing so, the system manager may transmit an instruction to each of the plurality of storage nodes, which when received by the storage node causes the storage node to initialize its respective pair of tracking tables by executing step 706 of the process 700.

At step 808, the system manager generates a first snapshot of the first storage subsystem. In some implementations, generating the first snapshot by the system manager may include any suitable type of action that causes the first storage subsystem to generate a snapshot of a production object that is stored in the first storage subsystem. Additionally or alternatively, in some implementations, generating the first snapshot by the system manager may include any suitable type of action that causes the first storage subsystem to generate a plurality of snapshots of different production objects that are stored in the first storage subsystem, wherein each of the snapshots corresponds to a different one of the production objects. In this regard, the first snapshot may be either a single snapshot or what is also sometimes referred to as a "snapset."

At step 810, the system manager receives a notification (e.g., a message) from one of the storage nodes that the respective drain table of the storage node has been emptied. In some implementations, the notification may be transmitted as a result of the storage node executing steps 716-726 of the process 700.

At step 812, the system manager detects whether the respective drain table of each one of the plurality of storage nodes has been emptied. If the respective drain tables of all storage nodes in the plurality of storage nodes have been emptied, the process 800 proceeds to step 814. Otherwise, if the respective drain table of at least one of the plurality of storage nodes has not been emptied yet, the process 800 returns to step 810.

By way of example, in some implementations, when the respective drain table of each of the plurality of the storage nodes has been emptied, a set of in-flight I/O requests that is processed by the plurality of storage nodes is guaranteed to have been completed. As noted above, any incoming I/O request that is received at the data storage system may be decomposed in multiple data storage requests that are provided to different ones of the plurality of storage nodes. In this regard, waiting for the drain tables of all storage nodes to be emptied, ensures that the all parts of the incoming I/O request have been completed irrespective of how these parts were routed to different storage nodes. Accordingly, in some implementations, the plurality of storage nodes that is identified at step 802 may include all possible storage nodes to which data storage commands that are generated by decomposing I/O requests (or a particular type of I/O requests) can be routed under a current configuration of the storage system.

At step 814, the system manager instructs each of the plurality of storage nodes to flip that node's respective table of tracking tables. In doing so, the system manager may transmit an instruction to each of the plurality of storage nodes, which when received by the storage node causes the storage node to flip its respective pair of tracking tables by executing step 712 of the process 700. According to the present example, each of the storage nodes may be instructed to flip the storage node's respective pair of tables only after the first snapshot is generated at step 812.

At step 816, the system manager transmits an instruction to the second storage subsystem to generate a second snapshot of the second storage subsystem. In some implementations, the instruction may be transmitted to a node in the second storage subsystem (e.g., a digital protection appliance) that is configured to cause the second storage subsystem to generate the second snapshot of the second storage subsystem. In some implementations, the second snapshot may include a snapshot of a production object that is stored in the second storage subsystem. Additionally or alternatively, in some implementations, the second snapshot may include a plurality of snapshots of different production objects that are stored in the second storage subsystem, wherein each of the snapshots corresponds to a different one of the production objects. In this regard, the second snapshot may be either a single snapshot or what is also sometimes referred to as a "snapset."

At step 818, the system manager detects whether the data replication session of the first storage subsystem and the second storage subsystem is out of synch. In some implementations, detecting whether the replication synch may include detecting whether one or more errors have occurred in any of the first storage subsystem and the second storage subsystem. Such errors may include errors arising from a storage server crashing, errors resulting from a storage server loosing network connectivity and/or any other suitable type of error. If the replication session is out of synch, the process 800 proceeds to step 820. Otherwise, if the replication session is in-synch, the process 800 returns to step 808.

At step 820, the system manager generates a difference between one or more production objects that are stored in the first storage subsystem and the first snapshot of the first storage subsystem, and transmits the difference to the second storage subsystem. By way of example, in some implementations, because: (i) the first snapshot of the first storage subsystem is generated before the second snapshot of the second storage subsystem, and (ii) the second storage system performs synchronous data replication, the data stored in (or otherwise represented by the) first snapshot of the first storage subsystem may be guaranteed to be the same as, or a subset of, the data that is stored in (or otherwise represented by) the second snapshot of the second storage subsystem. This in turn may permit the second storage subsystem to use the difference transmitted at step 820 to restore one or more replication volumes in the in the second storage subsystem to a state that matches this of one or more production volumes in the first storage subsystem.

More particularly, according to the present example, generating the first and second snapshots in a sequence in which: (i) the first snapshot is generated first, and (ii) the second snapshot is generated after the first snapshot and after the drain tables of the storage nodes are emptied ensures that the difference between the one or more production objects and the first snapshot will be greater than the difference between corresponding replication objects stored in the second storage subsystem and the second snapshot. Consequently, when the difference between the one or more production objects and the first snapshot is provided to the second storage subsystem, the second storage subsystem is given all data that is necessary to bring the state of the second storage subsystem in synch with the state of the first storage subsystem (e.g., at least with respect to the one or more production objects).

According to aspects of the disclosure, FIGS. 7A-B and 8, and their accompanying discussion, provide examples of processes that can be utilized by a storage system to generate snapshots of the system's production site and the system's data replication site that are synchronized with one another. These processes are suitable for use in storage systems that have strict I/O latency requirements because they do not require the periodic suspension of the storage system's host. Other techniques known in the art synchronize the generation of production-site snapshots with the generation of replication-site snapshots by suspending the service of new I/O requests and waiting for in-flight I/O requests to complete. Unlike these techniques, the use of alternating pairs of tracking table, allows processes discussed with respect to FIGS. 7A-B and 8 to avoid suspension of service of new I/O requests, thus rendering these processes preferable for use in storage systems with strict latency requirements.

According to aspects of the disclosure, when an instruction to perform an action is transmitted by a system manager to a storage node, the instruction may include any suitable type of number, string, or alphanumerical string which when received by the storage node causes the storage node to perform the action. In some implementations, transmitting the instruction may include transmitting the instruction over a communications network, such as an InfiniBand network and/or storing the instruction in a shared memory. In some implementations, transmitting a message or another notification from a storage node to the system manager may include transmitting the message (or notification) may include transmitting the message over a communications network and/or storing the message in a shared memory. Stated succinctly, the present disclosure is not limited to any specific method of communication between the system manager and storage nodes. Although in the example of FIG. 8, the system manager is part of the first storage subsystem, alternative implementations are possible in which the system manager is part of the second storage system. Although in the present example, the second storage subsystem performs synchronous data replication of I/O requests, alternative implementations are possible in which the second storage system performs asynchronous data replication.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context. "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about". "substantially" or "approximately" preceded the value of the value or range.

Moreover, the terms "system." "component." "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes. CD-ROMs, hard drives, or any other machine-readable storage medium, wherein, when the program code is loaded into and executed b) a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage node, the method comprising:
    storing, in a memory of the storage node, a pair of tracking tables, each of the tracking tables being arranged to alternate between an active table designation and a drain table designation, each of the tracking tables in the pair being arranged to have a different designation than the other tracking table in the pair;
    recording all incoming data storage requests that are received at the storage node in one of the tracking tables that is currently designated as an active tracking table of the storage node;
    flipping the respective designations of the tracking tables;
    removing any remaining data storage requests, from one of the tracking tables that is currently designated as a drain table of the storage node, when the remaining data storage requests are completed;
    transmitting, to a management node, a notification that the drain table of the storage node is empty, the notification being transmitted after all of the remaining data storage requests have been removed from one of the tracking tables that is currently designated as the drain table of the storage node.

2. The method of claim 1, wherein the respective designations of the tracking tables are flipped in response to an instruction from the management node.

3. The method of claim 1, wherein recording all incoming data storage requests in one of the tracking tables that is currently designated as the active tracking table of the storage node includes adding respective identifiers corresponding to the incoming data storage requests to the tracking table that is currently designated as the active tracking table.

4. The method of claim 1, wherein incoming data storage requests are recorded in any given one of the tracking tables in the pair only during periods when the given tracking table is designated as an active table of the storage node.

5. The method of claim 1, wherein flipping the respective designations of the tracking tables includes: (i) changing the respective designation of one of the tracking tables in the pair from the drain table designation to the active table designation, and (ii) changing the respective designation of the other one of the tracking tables in the pair from the active table designation to the drain table designation.

6. The method of claim 1, further comprising detecting whether one of the tracking tables that is currently designated as the drain table is empty.

7. The method of claim 1, wherein the storage node includes a control node of a storage system, and each of the incoming data storage requests includes a control node command that is generated by any of a plurality of routing nodes in the storage system.

8. A system comprising:
    a memory; and
    at least one processor that is operatively coupled to the memory, the at least one processor being configured to perform the operations of:
    storing, in the memory, a pair of tracking tables, each of the tracking tables being arranged to alternate between a tracking table designation and a drain table designation, each of the tracking tables in the pair being arranged to have a different designation than the other tracking table in the pair;
    recording any incoming data storage requests in one of the tracking tables that is currently designated as an active tracking table;
    flipping the respective designations of the tracking tables;
    removing any remaining data storage requests, from one of the tracking tables that is currently designated as a drain table, when the remaining data storage requests are completed;
    transmitting, to a management node, a notification that one of the tracking tables that is currently designated as the drain table is empty, the notification being transmitted after all of the remaining data storage requests have been removed from one of the tracking tables that is currently designated as the drain table.

9. The system of claim 8, wherein the respective designations of the tracking tables are flipped in response to an instruction from the management node.

10. The system of claim 8, wherein recording any incoming data storage requests in one of the tracking tables that is currently designated as the active tracking table includes adding respective identifiers corresponding to the incoming data storage requests to the tracking table that is currently designated as the active tracking table.

11. The system of claim 8, wherein incoming data storage requests are recorded in any given one of the tracking tables in the pair only during periods when the given tracking table is designated as an active table.

12. The system of claim 8, wherein flipping the respective designations of the tracking tables includes: (i) changing the respective designation of one of the tracking tables in the pair from the drain table designation to the active table designation, and (ii) changing the respective designation of the other one of the tracking tables in the pair from the active table designation to the drain table designation.

13. The system of claim 8, wherein the at least one processor is further configured to perform the operation of detecting whether one of the tracking tables that is currently designated as the drain table is empty.

14. The system of claim 8, wherein the processor is configured to execute a control node of a storage system, and each of the incoming data storage requests includes a control node command that is generated by any of a plurality of routing nodes in the storage system.

15. A non-transitory computer-readable medium configured to store one or more processor-executable instructions which when executed by at least one processor cause the at least one processor to perform the operations of:

storing, in a memory of a storage node, a pair of tracking tables, each of the tracking tables being arranged to alternate between a tracking table designation and a drain table designation, each of the tracking tables in the pair being arranged to have a different designation than the other tracking table in the pair;

recording all incoming data storage requests that are received at the storage node in one of the tracking tables that is currently designated as an active tracking table of the storage node;

flipping the respective designations of the tracking tables;

removing any remaining data storage requests, from one of the tracking tables that is currently designated as a drain table of the storage node, when the remaining data storage requests are completed;

transmitting, to a management node, a notification that the drain table of the storage node is empty, the notification being transmitted after all of the remaining data storage requests have been removed from one of the tracking tables that is currently designated as the drain table of the storage node.

16. The non-transitory computer-readable medium of claim 15, wherein the respective designations of the tracking tables are flipped in response to an instruction from the management node.

17. The non-transitory computer-readable medium of claim 15, wherein recording all incoming data storage requests in one of the tracking tables that is currently designated as the active tracking table of the storage node includes adding respective identifiers corresponding to the incoming data storage requests to the tracking table that is currently designated as the active tracking table.

18. The non-transitory computer-readable medium of claim 15, wherein incoming data storage requests are recorded in any given one of the tracking tables in the pair only during periods when the given tracking table is designated as an active table.

19. The non-transitory computer-readable medium of claim 15, wherein flipping the respective designations of the tracking tables includes: (i) changing the respective designation of one of the tracking tables in the pair from the drain table designation to the active table designation, and (ii) changing the respective designation of the other one of the tracking tables in the pair from the active table designation to the drain table designation.

20. The non-transitory computer-readable medium of claim 15, wherein the storage node includes a control node of a storage system, and each of the incoming data storage requests includes a control node command that is generated by any of a plurality of routing nodes in the storage system.

\* \* \* \* \*